United States Patent [11] 3,615,726

[72] Inventor David C. McMillan
 Shelton, Wash.
[21] Appl. No. 822,841
[22] Filed Apr. 14, 1969
[45] Patented Oct. 26, 1971
[73] Assignee Olympia Oyster Company
 Shelton, Wash.

[54] PROCESS FOR PASTEURIZING AND SEALING OYSTERS
5 Claims, No Drawings
[52] U.S. Cl................................................ 99/217,
 99/111, 99/195
[51] Int. Cl...................................................... A23l 1/33,
 A23l 3/00
[50] Field of Search.......................................... 99/111,
 195, 217, 221

[56] References Cited
UNITED STATES PATENTS
3,427,171 2/1969 Jeppson........................ 99/221

Primary Examiner—Raymond N. Jones
Assistant Examiner—Robert M. Elliott
Attorney—W. E. Ramsey ABSTRACT: This invention concerns a method for preparing oysters and similar products, preparatory to holding them in refrigerated storage, by heating them by radiant energy in the so-called microwave spectrum without raising the temperature thereof about 170° F. so as not to destroy their firmness and taste as compared to (1) freshly shucked oysters (2) maintained for short periods of time at temperatures just above freezing.

PROCESS FOR PASTEURIZING AND SEALING OYSTERS

My invention relates to a method of precooking oysters only to a pasteurization temperature by the use of microwave or processing frequencies of radiant energies, intensity and amplitudes that an oyster meat may attain a predetermined internal temperature sufficient to control bacterial growth, provide good keeping qualities, but one that does not develop off-flavors or smells foreign to those of freshly shucked oysters. Temperatures from 140°–170° F. are sufficient to pasteurize foodstuffs. I have found that oysters and other delicate shellfish should attain internal temperatures of pasteurization at about 140° F.

I have discovered that if freshly shucked oyster meats are fed through an oven by a travelling belt for a closely controlled period of time while being exposed to radiant energy of microwave or processing frequencies, said meats will not be broken down in texture to the extent that they loose their firmness. Loss of firmness in an oyster is produced by boiling or by use of convection or conduction heating. Pasteurization by the use of microwave or processing frequencies under pasteurizing temperatures in the range of 140° F. will not produce undesirable deterioration in muscle tone, taste and other measures of freshness if they are thereafter promptly subjected to sharp freezing at temperatures of around 40° F. and thereafter are maintained at holding temperatures of slightly below 0° F.

Microwave radiation is assigned frequencies and wave lengths by the FCC and are sometimes designated as dielectric heating (radio frequencies) if the frequencies are of 13.5, 27 or 40 megacycles per second. If they are in the range of 890 to 940 megacycles per second, they are sometimes designated as microwave heating and if they are in the range of 2,450–2,500 megacycles per second, they are sometimes defined as processing heating. My experimental work leads me to the conclusion that an oyster meat exposed to microwave energy of the latter two frequencies, and, particularly, the processing frequency, for periods approximating a minute and a half, the interior temperatures will be elevated to a temperature about 140° F. Such elevation of temperature will permit the oyster meats to retain their firmness and fresh taste. At this temperature, the meats will be pasteurized against rapid bacterial deterioration and will fix flavor qualities and firm tissues. Substantially lesser attained elevated temperatures will not produce keeping qualities due, in my opinion, to insufficient pasteurization and substantially greater temperatures will produce flabby structure and a "cooked" flavor and the meat will be sterilized.

It is a characteristic of microwave cooking of foods, that the interior is heated more quickly than the exterior portions. If radiation is closely controlled, said internal temperatures will be attained and restricted. When the oyster meats are discharged from the oven, they usually are breaded and packaged after being sharp frozen at temperatures approaching minus 40° F. They are held thereafter at keeping temperatures of around minus 10° F. They will have a shelf life of many months, as long as one year, rather than being measurable in days. It is may observation that oyster meats thus subjected to a restricted internal pasteurizing temperature and external temperature of much less amplitude, do not give up very much of their moisture content. The internal moisture is driven outwardly toward the peripheral surface of the oyster meat. This produces a viscous external covering that is sticky and adherent. Said external covering is unbroken and defines a sealing element about each oyster meat against airborne bacteria and other sources of external contamination or deterioration.

It is desirable to utilize the viscosity and adherent quality to producing a dry firm seal or sheathing about each oyster meat. It is for this reason that I thus "bread" the oyster meat as soon as it is sharp frozen, after applying a coating of finely divided dry cracker crumbs or other particulate dry vegetable matter that will not introduce to the product, undesirable tastes. This particulate matter absorbs and holds the excess moisture content of the covering and inhibits a coated oyster meat from sticking, one to the other.

One advantageous facility which takes place in the form of this viscous covering, that is the external surface of the oyster meat, attains a putty coloring upon discharge from the oven and this is somewhat unattractive. When these meats, however, are breaded with finely divided toasted crumbs, the change in coloration, due to pasteurization, is masked by the brown or tan coloration of the toasted crumb-coating material. That is to say, said particulate vegetable matter forms a protective sheathing by absorption of the moisture content of the viscous tacky oyster as it comes from the oven and the meat is given an aesthetic change if said crumbs have previously been toasted. Thus the breading operation produces two useful functions, i.e., eliminates tackiness and produces a crust and also produces an aesthetic benefit.

After the precooked oysters have had their temperature raised from minus 40° F., which is the approximate sharp freezing temperature, to a holding temperature approximating minus 10° F., it is desirable that the oysters be maintained spaced from each other, as in separate encapsulations. It is preferable that the encapsulating enclosures be made by two opposed sheets or films, having spaced pockets formed in one of the sheets. Into each pocket a single precooked frozen and breaded oyster is lodged, similar to candy lodged in trays, and the pockets are sealed by the overlying sheet or film of sealing material.

Said sheets of sealing material are usually vacuum sealed, or sealed in an inert gaseous medium, to reduce oxidation. It is not essential that a subnormal atmospheric pressure be created within the package. I have found it desirable, however, to maintain the qualities retained in the product immediately after they are frozen.

If substantial reduction in air pressure is drawn, it usually is done by an evacuating pump that withdraws the air entrapped within the container to approximately 28 inches of mercury and then seals the point of of entrance so that the two sheets constitute a sealed bag or package. Then the pressure within the container, after sealing and maintained under a holding temperature of about minus 10° F., will stand and remain at about 15–20 inches mercury pressure. If an inert gas is used to crowd out entrapped air surrounding the edible products thus produced and held within said sealed bag, it is the usual practice to induce a pressure slightly above atmospheric pressure, say one pound pressure above atmospheric, at sea level.

Many types of material, such as plastic film, laminated and otherwise, are presently available. The selection of a particular plastic forms no part of my invention and from time to time plastic formulations and lamination are changed by manufacturers who do not inform the trade their exact composition. These films are usually denominated as polyethylene, nylon, Scotchback, Polycel, Aclar and various other transparent films. Laminations sometimes are polyester film, laminated with a polyethylene film, or treated with a special polyester coating. Reference is made to the type of film presently selected as identified by its tradenames, or their generally accepted technical names to aid a person skilled in the art to practice this process effectively.

The effective pasteurization, as produced by the method heretofore disclosed, tends to maintain freshness associated with freshly shucked oysters as they are maintained at a more or less constant lowered temperature and for a very short period of time, measured in hours or several days. As a result processed oysters, as has heretofore been described, may be shipped to stores and customers many miles away from the seaboard from which they were gathered and shucked. Thus, the retention of taste and firmness of fresh oysters is not possible from a practical standpoint, by use of methods now known and practiced. By my process, oysters may be enjoyed as long as said processed oysters are sealed and held under refrigerated holding temperatures.

The sharp-freezing temperature and the holding temperature is not critical. I have found that it follows generally that required by dairy products, such as ice cream.

Although my invention has been described in connection with the preparation and packaging of oyster meats, I contend to be within the range of my invention, other shellfish or other fish generally, which lose their fresh taste rapidly after they have been taken from the water and processed by shucking, or otherwise. Many of these have very delicate tastes that are rapidly dissipated and are usually lost when packaged in cans or jars.

An oven used in this process is one that may be purchased on the market for microwave or processing treatment. At microwave and processing frequencies, energy of 1,500–1,800 watts are directed about and through the product being pasteurized while it is travelling supported by an endless belt producing a cooking cycle of about 1½ minute exposure for said radiation. Oysters particularly require careful control of their external portions of peripheral surfaces, because there is a cape or mantle on said surface that is quite thin and elevated temperatures higher than those referred to herein oxidize and burn said thin membranes, producing carbon spots. This dictates the necessity for short exposure time and close control.

When oysters and other similar foodstuffs, pasteurized by the method disclosed herein, are ready for delivery at the retail level, they may be removed from their sealing encapsulation and fried in deep fat, for example, for about 4 minutes and the resulting product will have the taste and look of freshly shucked oysters similarly cooked.

PRIOR ART

There are several standard methods that the oyster industry used to process and market oyster meats:

1. Oysters prepared by conventional canning methods, that is canned or retorted;
2. Smoked oysters, canned by conventional methods;
3. Freshly shucked oyster meats, washed and cooled in cool, fresh water and packaged in containers and usually held at approximately 33° F. by being covered with comminuted ice;
4. Freshly shucked oyster meats, washed in fresh cool water, packaged in containers and frozen until used.

The Atomic Energy Commission has supervised experimental research processing irradiated oyster meats. Data indicates that low-level irradiation does not pasteurize the fresh product and high-level radiation while sterilizing the product produces serious undesirable flavor and appearance changes.

Oyster meats canned by conventional processes (1) lose all of the "fresh" qualities and attributes. Freshly shucked and refrigerated oysters (3) retain their fresh qualities for 10–14 days and then spoil rapidly. Freshly shucked and frozen oyster meats (4) retain some of their fresh qualities for quite a while. However, they lose their fresh qualities and natural body firmness immediately upon thawing and their fresh flavor in 3–4 months while they remain frozen. The shelf life of freshly shucked and refrigerated oysters following low levels of irradiation, has been increased only to 14 to 20 days.

I claim:

1. A process for treating freshly shucked oysters and other delicately flavored shellfish, preparatory to refrigerated storage thereof, comprising the procedural steps of pasteurizing them by raising their temperatures throughout their cross section to a range of 140°–170° F. by the use of microwave or processing frequencies approximating 2450–2500 megacycles per second, and thereafter lowering their temperature to a sharp-freezing temperature of about minus 40°.

2. A process for treating freshly shucked oysters and other delicately flavored shellfish preparatory to refrigerated storage thereof, the step involving pasteurizing them by holding the temperatures throughout their cross section to a range of 140°–170° F. by the use of microwave or processing frequencies while passing them through an oven having a microwave tunnel, for a period of time such that the interior of said articles are raised to said pasteurizing noncooking temperatures thereby producing vapors, and constraining moisture adjacent the peripheral surface of said articles in an enveloping viscous coating, and thereafter lowering their temperature to a sharp-freezing temperature of about minus 40° F.

3. The process defined in claim 2, including the step prior to sharp freezing, of producing a coating by applying particulate neutral dry vegetable matter on the peripheral surface of said articles and holding said particulate dry vegetable matter in intimate contact therewith to absorb most of the moisture content of said viscous coating.

4. The process defined in claim 2, including the further steps of thereafter providing a coating by applying particulate neutral dry vegetable matter on the peripheral surface of said articles and holding said particulate dry vegetable material matter in intimate contact therewith to absorb most of the moisture content of said viscous coating, reducing the temperature of said coated articles to sharp-freezing temperature of about minus 40° F., arranging said frozen, coated articles in spaced relation to each other within an airtight envelope, reducing the air pressure therein by several pounds per square inch, and then sealing said envelope.

5. The process defined in claim 2, including the further steps of thereafter providing a coating by applying particulate neutral dry vegetable matter on the peripheral surface of said articles and holding said particulate dry vegetable material matter in intimate contact therewith to absorb most of the moisture content of said viscous coating, reducing the temperature of said coated articles to sharp-freezing temperature of about minus 40° F., arranging said frozen, coated articles in spaced relation to each other within an airtight envelope and reducing the atmosphere within the envelope by introduction of an inert gas therein to tend to inhibit oxidation of said articles, and thereafter sealing said envelope.